US008645472B2

(12) United States Patent
Pihlajamaki et al.

(10) Patent No.: US 8,645,472 B2
(45) Date of Patent: Feb. 4, 2014

(54) SYSTEM AND METHOD FOR INFORMING A SENDER OF A MESSAGE OF CONTENT ADAPTATION AND MESSAGE FAILURE ISSUES

(75) Inventors: Sisko Pihlajamaki, Tampere (FI); Miraj Mostafa, Tampere (FI); Paivi Vesanto, Tampere (FI); Arja Pietikainen, Tampere (FI); Heikki Poikela, Tampere (FI)

(73) Assignee: Vringo Infrastructure Inc., New York, NY (US)

( * ) Notice: Subject to any disclaimer, the term of this patent is extended or adjusted under 35 U.S.C. 154(b) by 2153 days.

(21) Appl. No.: 10/899,322

(22) Filed: Jul. 26, 2004

(65) Prior Publication Data
US 2006/0020669 A1    Jan. 26, 2006

(51) Int. Cl.
*G06F 15/16*    (2006.01)
(52) U.S. Cl.
USPC ........................................ 709/206; 709/207
(58) Field of Classification Search
USPC ................................................ 709/206–207
See application file for complete search history.

(56) References Cited

U.S. PATENT DOCUMENTS

| | | | |
|---|---|---|---|
| 6,963,972 B1 * | 11/2005 | Chang et al. | 713/153 |
| 2002/0044634 A1 * | 4/2002 | Rooke et al. | 379/93.01 |
| 2002/0132608 A1 | 9/2002 | Shinohara | |
| 2003/0172121 A1 | 9/2003 | Evans et al. | |
| 2003/0172173 A1 | 9/2003 | Fenton | |
| 2004/0057403 A1 | 3/2004 | Jerbi et al. | |

FOREIGN PATENT DOCUMENTS

| | | |
|---|---|---|
| AT | 302517 T | 9/2005 |
| AU | 4033099 A | 11/2000 |
| CN | 1377201 A | 10/2002 |
| DE | 69926807 T2 | 6/2006 |
| DK | 1169827 T3 | 10/2005 |
| EP | 1169827 A | 1/2002 |
| ES | 2245103 T3 | 12/2005 |
| GB | 2 404 112 | 5/2003 |
| JP | 09-083565 | 3/1997 |
| JP | 2000-349809 | 12/2000 |

(Continued)

OTHER PUBLICATIONS

Short Message Service (SMS) for fixed networks; Network Based Solution (NBS); Part 2: Architecture and functional entities, European Telecommunications Standards Institute, 2003, pp. 1-19.
Canadian Office Action for related Canadian Application No. 2575106 dated Mar. 12, 2012, pp. 1-3.
Office Action for Chinese Patent Application No. 200580032286.0, dated Jun. 15, 2011.

(Continued)

*Primary Examiner* — Maceeh Anwari
(74) *Attorney, Agent, or Firm* — Cozen O'Connor; Ian R. Blum (57) ABSTRACT

A system and method for controlling the content of a message transmitted from a transmitting device to a receiving device. When a message is sent from the transmitting device, it is determined whether the receiving device is capable of exhibiting the message without adaptation of the message's content. If the receiving device is capable of exhibiting the message without adaptation of the message's content, the receiving device exhibits the message. If the receiving device is not capable of exhibiting the message without adaptation of the message's content, the transmitting device is informed that the message could not be exhibited on the receiving device without adaptation of the message's content. The receiving device can also be informed what portions cannot be exhibited by the receiving device, and instructions can be provided so that the receiving device does not display the message at all if the message must be adapted.

33 Claims, 4 Drawing Sheets

(56) References Cited

FOREIGN PATENT DOCUMENTS

| JP | 2002-328831 | 11/2002 |
| JP | 2002542548 A | 12/2002 |
| WO | WO 00/64110 A1 | 10/2000 |
| WO | WO-02/28006 | 4/2002 |
| WO | WO 02/28006 A2 | 4/2002 |
| WO | WO-02/63838 | 8/2002 |
| WO | WO 03/085999 | 10/2003 |

OTHER PUBLICATIONS

English Translation of Office Action for Chinese Patent Application No. 200580032286.0, dated Jun. 15, 2011.
Notice of Allowance for Chinese Patent Application No. 200580032286.0, dated Sep. 27, 2011.
European Search Report for related European Patent Application No. 05772981.6-2416/1779684 PCT/IB2005/002179, dated Jan. 2, 2012, pp. 1-8.

* cited by examiner

SYSTEM AND METHOD FOR INFORMING A SENDER OF A MESSAGE OF CONTENT ADAPTATION AND MESSAGE FAILURE ISSUES

FIELD OF THE INVENTION

The present invention relates generally to the field of multimedia messaging systems. More particularly, the present invention relates to multimedia messaging systems that support complex content items and forms.

DESCRIPTION OF THE RELATED ART

Multimedia messaging systems have greatly increased in popularity in recent years. Traditionally, individuals have used multimedia messaging systems to transmit basic text messages to other individuals on a network. More recently, however, individuals have begun to transmit much more complex types of information. This can include, for example, texts using individualized fonts and styles, as well as graphics, digital photographs, audio files, video files, and more. These types of information can be transmitted on devices such as portable telephones, personal digital assistants, hand-held personal computers, and other devices.

With this virtual explosion in the capabilities of multimedia messaging systems, a number of new issues have arisen for users of such systems. For example, while newer devices often include the capability to both send and receive these types of "complex" multimedia messages, most older devices and many newer, less expensive devices are still extremely limited in their messaging capability, offering the user only the ability to send and receive limited text messages without any stylization or attachments. These more "limited" devices also often are not capable of transmitting or receiving information over a certain size.

The above limitations can create serious compatibility issues for users of both simple and complex devices. For a user of an older and/or simple device with limited capabilities, he or she may not even be able to access large and/or complex multimedia messages. Additionally, although such devices or their service systems may include the ability for the user to at least view text of some complex multimedia messages, the specialized stylization, formatting and attachments that may have been included by the multimedia message sender will be stripped from the multimedia message, and the recipient may not even be aware that attachments were even included with the message. This alteration of the content and/or format of the message, often referred to as content adaptation, creates a number of difficulties for both the sender and the recipient of the message.

For users of more complex devices, the user may not be aware that the intended recipient of complex multimedia messages has limited capabilities on his or her device, resulting in a great deal of wasted effort in creating multimedia messages with advanced features which will never be accessible by the recipient. In instances where the sender prepared particularly a fanciful presentation for the recipient, converting and/or stripping portions of it may make it virtually unrecognizable or otherwise modify it to the point that the sender feels that it would not have even been worthwhile to transmit the presentation in the first place.

Furthermore, in some instances the sender of the complex multimedia message may not even be informed of the limited recipient capabilities after the multimedia message has been sent. A number of devices include a User Agent Profile (UAProf), an XML or extended markup language file that describes the capabilities of the device. However, even if there is UAProf support, the sender of a message does not have the capability to even estimate the capabilities of the recipient before the message is transmitted. This creates obvious problems for both parties, as the recipient may not receive an expected message, and the sender may not learn that the message failed to reach the recipient. In addition, even if a small portion (such as the text alone) does make it to the recipient's device for access, the sender may not know that the formats and styles have been stripped, or that the attachments to the files could not be accessed.

One attempt to overcome some of the above-identified shortcomings has involved using the multimedia messaging service center (MMSC) to send a report to the original multimedia message sender discussing the status of the sent multimedia message. For example, one traditional system has the MMSC automatically send the multimedia message sender one of the following pieces of information regarding the sent multimedia message: "Expired", "Retrieved", "Rejected", "Deferred", "Unrecognized", "Indeterminate", "Forward" and "Unreachable". Although providing the sender with this very rudimentary information about the status of the sent multimedia message, such single-word informational messages do not greatly help the sender in understanding potential problems. Also, these informational messages do nothing to inform the sender that parts of the sent multimedia message may have had to have been converted and/or stripped before reaching the recipient, as well as what (if any) portions of the sent multimedia message were transmitted without stripping and/or converting. Information about content adaptation can be very relevant to the multimedia message sender, as important content may have been dropped during the adaptation process. Even in cases where the dropped content could be later made available to the user, such as through an alternative recipient device, it may be important to the multimedia message sender to know if all of the content had reached the recipient immediately.

It would therefore be desirable to develop a system and a method that overcomes the above-identified difficulties while maintaining the improvements in functionality that are continuously being implemented in multimedia messaging systems.

SUMMARY OF THE INVENTION

The present invention provides the sender of a message, particularly a multimedia message, the ability to control the adaptation of a message and/or to obtain information regarding whether any adaptation has occurred, as well as the ability to learn more about potential problems involved with the transmittal of the message. This provides the sender with a number of advantages that were not previously available. For example, the present invention gives the sender a higher degree of control over the message, while also giving the user the ability to tailor the message depending upon the capabilities of the recipient device.

The present invention involves a system and method for providing additional information to a multimedia message sender about the status of a recently-transmitted multimedia message. The system involves the use of information in the form of a header or other mechanism regarding whether the message can be converted and/or partially stripped for the receiving device. Additionally, the system and method of the present invention involves providing additional information to the message sender regarding reasons why a message could not be delivered, as well as the nature and consequences of potential adaptation of the original message. The present invention also is directed to a computer program and module that implements the functions described herein.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
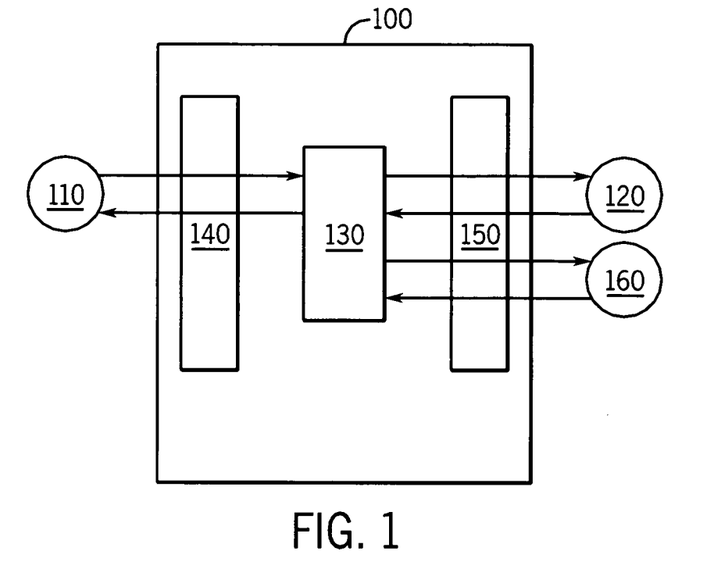
FIG. 1 is a representation of a multimedia messaging system network including a plurality of devices for transmitting and receiving messages according to one embodiment of the present invention.

FIG. 1 shows a generic multimedia messaging network 100 according to one embodiment of the present invention. The multimedia messaging network 100 is arranged to allow communication between a transmitting device 110 and a receiving device 120, as well as other secondary devices 160. In this embodiment of the invention, when a message is transmitted, the message travels from the transmitting device 110 to a multimedia messaging service center 130 (MMSC), which in turn transmits the message to the receiving device 120. FIG. 1 shows the transmittal among the transmitting device 110, the multimedia messaging service center 130 and the receiving device 120 as being generally direct. However, the transmittal of messages in reality will usually occur through a variety of local exchanges, represented generically at 140 and 150.

Figure 5:
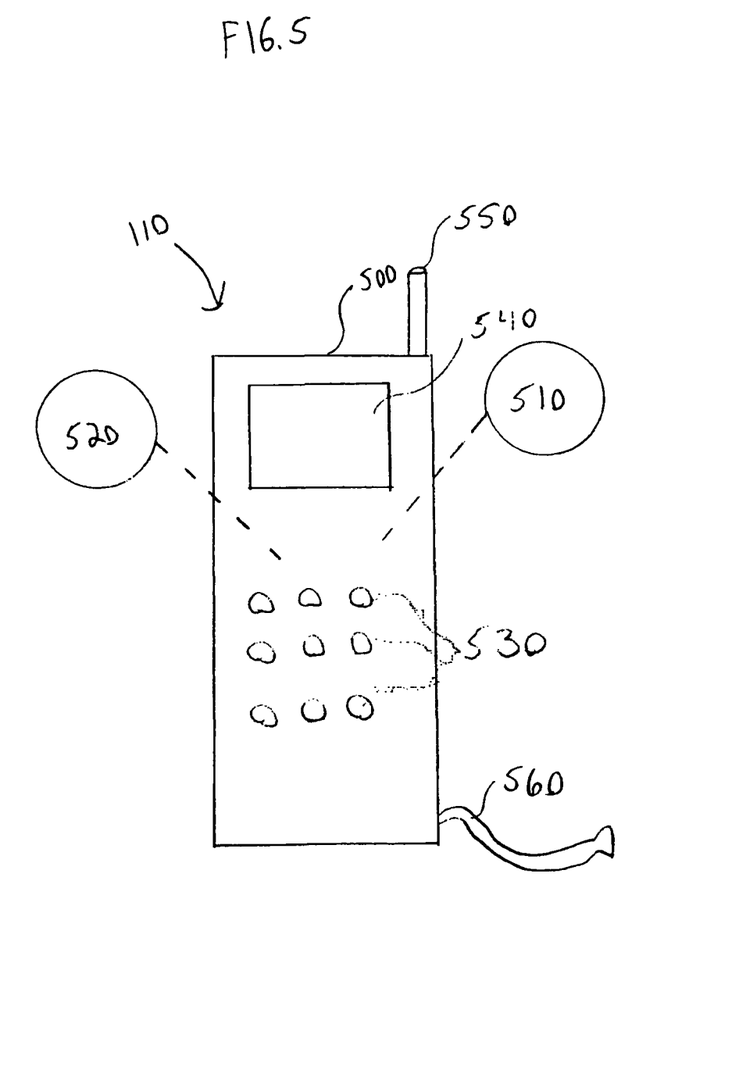
FIG. 5 is a front view of a generic portable device that can serve as a transmitting device according to the principles of the present invention.

FIG. 5 shows a sample transmitting device 110 that can be used in accordance with the principles of the present invention. The transmitting device 110 can take virtually any form and is not intended to be limited to one particular type of mechanism. The transmitting device 110 in FIG. 5 comprises a body 500 with a memory unit 510 and a processor 520 contained therein and are operatively connected to each other. A plurality of input buttons 530 are provided, as well as a display 540. The transmitting device 110 can include either a wired connection 560, such as a USB or IEEE connection, or a wireless connection 550 to transmit and receive messages. The memory unit 510 and the processor 520 can be used to generate the message to be transmitted.

According to one embodiment of the present invention, a new header field is added to the M-send.req protocol data unit (PDU) for the transmitting device 110 in order to ultimately provide additional control for the transmittal device over the message to be transmitted to the receiving device 120. This header specifies whether the multimedia messaging service center 130 is permitted to perform any content adaptation to the message being transmitted. If the header indicates that content adaptation is not permitted, the multimedia messaging service center 130 then determines whether the receiving device 120 is capable of receiving the message without adaptation. The answer to this question is transmitted back to the transmitting device 110 using the M-Send.conf PDU. The transmitting device 110 is then able to inform the user whether the message can be transmitted in a completely unmodified form. Although the use of a header as described herein is one method of use, various systems and/or computer software programs incorporating computer code can be used by those skilled in the art to achieve similar results.

Figure 2:
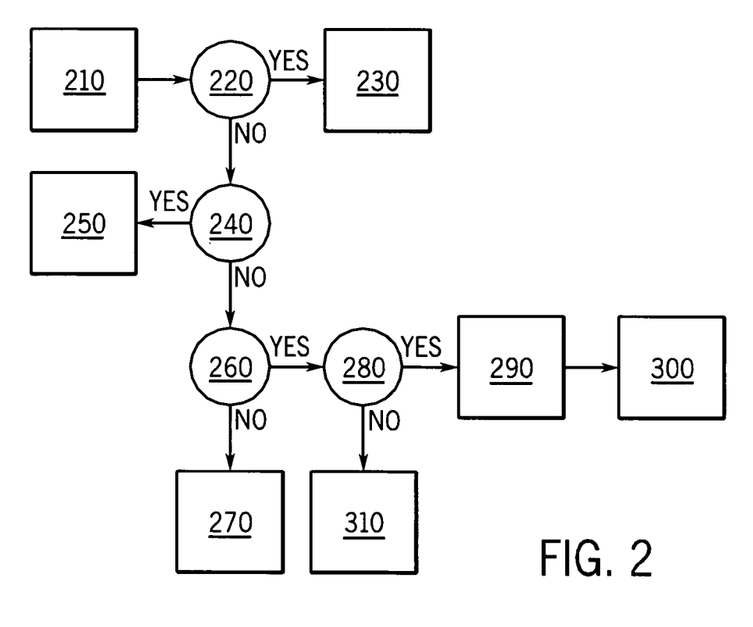
FIG. 2 is a flow diagram showing the process of determining whether a receiving device can accept a message without modification or adaptation and how the message is treated depending upon whether the message can be so accepted according to one embodiment of the invention.

FIG. 2 is a representation of how the transmitting device 110, the multimedia messaging service center 130 and the receiving device 120 interact according one embodiment of the present invention. FIG. 2 shows a simplified case where both the transmitting device 110 and the recipient device 120 belong to the same multimedia messaging service center 130. In many instances, the transmitting device 110 and the recipient device 120 belong to different multimedia messaging service centers 130. At step 210, the user transmits a message from the transmitting device 110 to the multimedia messaging service center 130. At step 220, the multimedia messaging service center 130 determines if the M-send.req PDU includes a header that would permit the message to be adapted or modified. If the header permits such modification, then at step 230 the multimedia messaging service center modifies the message as necessary and transmits the message to the receiving device 120 at step 230. The modifications are based upon the capabilities of the receiving device 120 in the UAProf. It should also be noted that, in the event the transmitting device 110 and the recipient device 120 belong to different multimedia messaging service centers 130, the processing depicted in FIG. 2 will occur in the recipient's multimedia messaging service center.

If the M-send.req PDU header does not permit modification of the message, then the multimedia messaging service center 130 determines whether the receiving device 120 is capable of receiving, processing and exhibiting the message in an unmodified form. This occurs at step 240. If the receiving device 120 is capable of receiving, processing and exhibiting the message without modification, then the multimedia messaging service center 130 transmits the message to the receiving device 120 at step 250 for such processing and display. It is also possible for step 240 to occur before the multimedia messaging service center 130 determines if the M-send.req PDU includes a header that would permit the message to be adapted or modified, with substantially the same result.

In one particular embodiment of the present invention and as also represented in FIG. 2, the system of the present invention can also automatically rout the unadapted message to a secondary device, shown at 160 in FIG. 1, if necessary. This can be accomplished through the use of a separate address field in the M-Send.req PDU. A separate address field can be added for the secondary address and the MMSC can be configured for using this separate address field as discussed herein.

As discussed above, in the event that the M-Send.req PDU includes a header instructing that no content adaptation should occur at the receiving device 120, the multimedia messaging service center 130 determines whether the receiving device 120 is capable of receiving the message in an unadapted form, shown at 240 in FIG. 2. If the receiving device 120 is not able to receive the message in an unadapted form, then the multimedia messaging service center 130 determines whether there is a separate address field in the M-Send.req PDU for transmitting the message to a secondary address. This is represented at 260 in FIG. 2. If no such alternate address exists, then at 270 the multimedia messaging service center 130 informs the transmitting device 110 that the message cannot be delivered to the receiving device 120 without modification. If there is an alternate address, on the other hand and as shown at step 280, the multimedia messaging service center 130 determines whether the secondary device 160 can accept the message without modification. This can be done using the UAProf of the secondary device in a manner similar to that discussed herein regarding the primary recipient device. If the secondary device 160 cannot so accept the message, then at step 310 the multimedia messaging service center 130 informs the transmitting device 110 that the message cannot be delivered to either the receiving device 120 or the secondary device without modification. If the secondary device can accept, process and exhibit the message without modification, then at step 290 the multimedia messaging service center 130 transmits the message to the secondary device 160 corresponding to the alternate address. The multimedia messaging service center 130, in one embodiment of the invention, also informs the transmitting device 110 that the message is being so redirected. The secondary device 160 then displays the message at step 300.

In the embodiment shown in FIG. 2, the transmitting device 110 is informed of the redirection after the message is transmitted to the secondary device 160. However, these two steps could occur in the opposite order or could occur simultaneously. It is also possible for there to be a string of secondary devices 160, such that if the message cannot be sent in an unadapted form to the original secondary device 160, that an attempt can be made to transmit the message to yet other devices. The address of the secondary device or addresses of the string of secondary devices can be entered by the user similar to the way the user would enter the address of the primary recipient device.

In an alternate embodiment of the invention, the M-Send.req PDU header could indicate that it is acceptable to have the message modified for the secondary device 160 only, in which case such a determination would not be necessary and the message could be transmitted to the secondary device 160 regardless of potential modification.

The separate address field can also be used in situations where the receiving device 120 is not multimedia messaging system-capable. The separate address could be an electronic mail account or another device address owned by the same individual as who owns the receiving device 120. At the same time, the transmitting device 110 can also be informed that the message has been transmitted to the secondary device 160.

Alternatively and depending on the provided service, a default location, such as an electronic mail address or a server in the network with Internet access, could be used in place of the secondary device when the unmodified message can be transmitted. In the situation where the transmitting device 110 does not forbid modification and the message requires modification, the modified message may be sent to the receiving device 120 and, depending on the provided service, the unmodified message can be transmitted to the default address.

Figure 3:
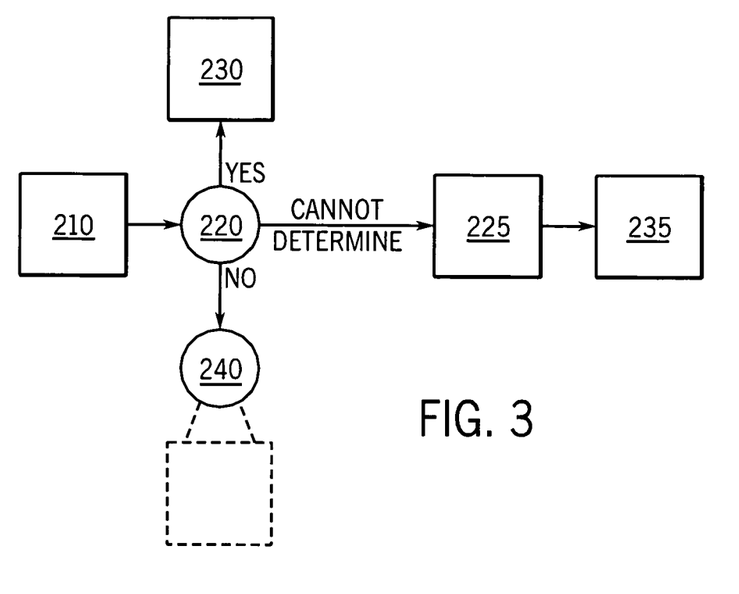
FIG. 3 is a flow diagram showing the process of determining whether a receiving device can accept a message without modification or adaptation, and upon not being able to make such a determination, how the message is treated.

One issue that can arise in practice involves the possibility that the receiving device 120 does not use the same multimedia messaging service center 130 as the transmitting device 110. In this situation, it may not be possible at the moment of message transmittal to determine whether content adaptation will be necessary. In this situation, the transmitting device 110 can still be informed whether content adaptation occurs once the receiving device 120 processes the message. FIG. 3 shows the process for this determination. As discussed above, at step 210, the user transmits a message from the transmitting device 110 to the multimedia messaging service center 130. At step 220, the multimedia messaging service center 130 determines if the M-send.req PDU includes a header that would permit the message to be adapted or modified. If the multimedia messaging service center 130 cannot determine whether the receiving device 120 can accept, process and exhibit the message without modification, then at step 225 the message is transmitted to the message recipient's multimedia messaging service center, which then performs the steps discussed herein and depicted in FIG. 2.

Figure 4:
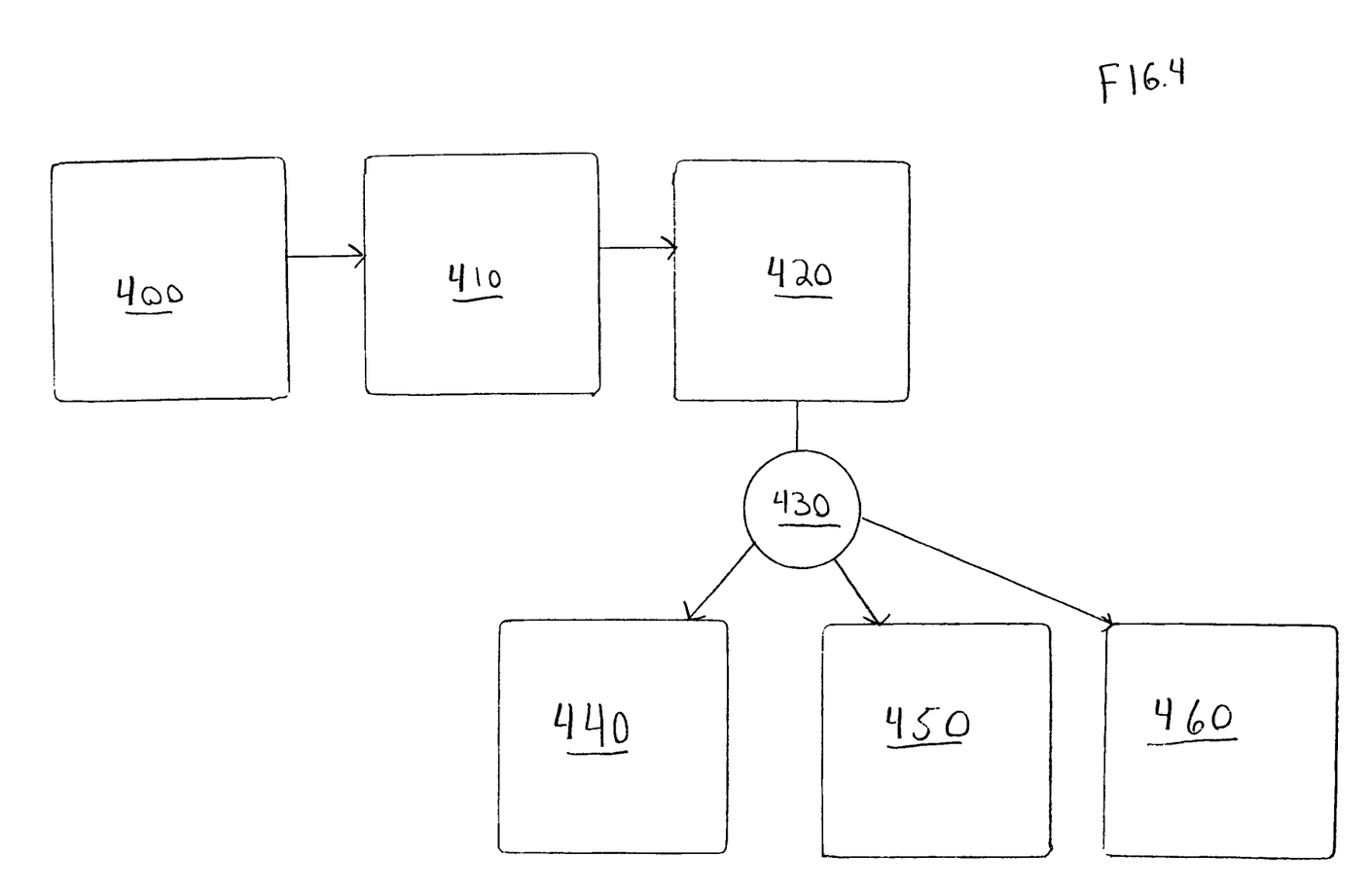
FIG. 4 is a flow diagram showing the process of informing the transmitting device as to whether the message was successfully sent and the level of adaptation necessary.

The present invention also involves the use of a new "reason" field within a multimedia messaging system delivery report that is transmitted to the transmitting device 110 after the message is transmitted to the receiving device 120. The process for accomplishing this task is shown generally in FIG. 4. FIG. 4 shows the process of providing this type of information as separate from the process of determining the capabilities of the receiving device 120 and the consequences thereof, shown in FIGS. 2-3. However, it is to be understood that the processes shown in FIGS. 2-4 could easily be implemented simultaneously as a single process for the transmitting device 110 and the receiving device 120.

As shown in FIG. 4, the transmitting device 110 transmits a message to the multimedia messaging service center 130 at step 400. At step 410, the multimedia messaging service center 130 processes and modifies the message as necessary depending upon the capabilities of the receiving device 120. The message is then transmitted to the receiving device 120, where it is exhibited to the user of the receiving device 120 if possible at step 420. At step 430, information is transmitted back to the transmitting device 110 regarding the transmitted message, including at least one of a plurality of messages in a multimedia messaging system delivery report that is transmitted back to the transmitting device 110. The delivery report is generated by the recipient's multimedia messaging service center 130.

If the entire message was able to be exhibited on the receiving device 120 without adaptation or modification, then at step 440 a multimedia messaging system delivery report is sent to the transmitting device 110 noting that no content adaptation was necessary. If, however, the message could not even be exhibited to the recipient in any form, then at step 450 a multimedia messaging system delivery report is sent to the transmitting device 110 informing the user of the transmitting device 110 as to why the message transmittal failed. The multimedia messaging system delivery report could provide information such as the fact that the receiving device 120 did not support the content, that the message was too large, that the receiving device address was unresolved, or that the receiving device 120 did not support the multimedia messaging system. This type of information aids the user of the transmitting device 110 in determining why the message could not be transmitted on the receiving device 120, possibly helping the user in altering his behavior in sending messages.

If the message was able to be exhibited on the receiving device 120, but only with some adaptation or modification, then at step 460 a multimedia messaging system delivery report is transmitted to the transmitting device 110 providing information about the modifications that were necessary. The information transmitted back to the transmitting device 110 could include but is not limited to information concerning whether minor or major adaptation was necessary, the types of content that had to be stripped from the message, and the amount of material that had to be stripped from the message.

This type of information could be especially helpful to a user who sends multimedia messages that have a large file size, as will often occur when audio and/or video files are included. In many cases, users of portable devices are billed based upon the size of the messages that are sent, and a user who is billed in this manner can save a considerable amount of money by not sending video files when they cannot be received by some other recipients.

In one embodiment of the present invention, some of the information provided in the delivery report can be optional, with the user of the transmitting device 110 able to decide what information he or she would like to be made aware of.

The system and method of the present invention provides the sender of a multimedia message with much more control over the integrity of the transmittal than has been conventionally available. In the event that the user believes that it is important that the message not be altered in any form, he or she simply can deny the ability to alter the message. Additionally, the present invention provides the sender of a message more information in situations where the message is ultimately not delivered successfully in exactly the same form as it was originally intended. The present invention can be incorporated into virtually any type of supportable module and can take the form of a computer software program that is programmed to execute the functions described herein.

It should be understood that the above description of the invention and specific examples and embodiments, while indicating some embodiments of the present invention, are given by demonstration and not limitation. For example, instead of incorporating a non-modification instruction into the M-Send.req PDU, it could also be transmitted separate from this PDU. It is also possible to include a "partial modification" instruction such that certain types of information can be removed and modified while other types cannot be so modified or adapted. Many changes and modifications within the scope of the present invention may therefore be made without departing from the spirit thereof and the present invention includes all such changes and modifications.

What is claimed is:

1. A method for controlling the content of a message transmitted from a transmitting device to a receiving device, comprising:
   sending a message from the transmitting device with information on the adaptability of the message, the information on the adaptability of the message being indicated via a header field in a protocol data unit for the transmitting device specifying whether adaptation of the message's content is permitted;
   determining whether the receiving device is capable of exhibiting the message without adaptation of the message's content;
   if the receiving device is capable of exhibiting the message without adaptation of the message's content, having the receiving device exhibit the message; and
   if the receiving device is not capable of exhibiting the message without adaptation of the message's content, informing the transmitting device that the message could not be exhibited on the receiving device without adaptation of the message's content.

2. The method of claim 1, further comprising preventing the message from being exhibited on the receiving device if the receiving device is not capable of exhibiting the message without adaptation of the message's content.

3. The method of claim 1, further comprising:
   if the receiving device is not capable of exhibiting the message without adaptation of the message's content, exhibiting the message on the receiving device in an adapted form; and
   if the receiving device is not capable of exhibiting the message without adaptation of the message's content, informing the transmitting device that the message could be exhibited on the receiving device in adapted form.

4. The method of claim 3, further comprising informing the transmitting device about differences between the message as transmitted by the transmitting device and the message in the adapted form.

5. The method of claim 1, further comprising, if the receiving device is not capable of exhibiting the message in any form, informing the transmitting device as to why the message cannot be exhibited by the receiving device.

6. The method of claim 1, further comprising:
   sending an address for a secondary device from the transmitting device;
   if the receiving device is not capable of exhibiting the message without adaptation of the message's content, determining whether the secondary device is capable of exhibiting the message without adaptation of the message's content; and
   if the secondary device is capable of exhibiting the message without adaptation of the message's content, having the secondary device exhibit the message.

7. The method of claim 6, further comprising, if the secondary device is capable of exhibiting the message without adaptation of the message's content, informing the transmitting device that the message was transmitted to the secondary device.

8. The method of claim 6, further comprising, if the secondary device is not capable of exhibiting the message without adaptation of the message's content, informing the transmitting device that the message could not be exhibited on the secondary device without adaptation of the message's content.

9. The method of claim 8, further comprising preventing the message from being exhibited on the secondary device if the secondary device is not capable of exhibiting the message without adaptation of the message's content.

10. A computer program, embodied on a non-transitory computer-readable medium, for controlling the content of a message transmitted from a transmitting device to a receiving device, comprising:
    computer code for sending a message from the transmitting device with information on the adaptability of the message, the information on the adaptability of the message being indicated via a header field in a protocol data unit for the transmitting device specifying whether adaptation of the message's content is permitted;
    computer code for determining whether the receiving device is capable of exhibiting the message without adaptation of the message's content;
    computer code for, if the receiving device is capable of exhibiting the message without adaptation of the message's content, transmitting the message to the receiving device; and
    computer code for, if the receiving device is not capable of exhibiting the message without adaptation of the message's content, informing the transmitting device that the message could not be exhibited on the receiving device without adaptation of the message's content.

11. The computer program of claim 10, further comprising computer code for preventing the message from being exhibited on the receiving device if the receiving device is not capable of exhibiting the message without adaptation of the message's content.

12. The computer program of claim 10, further comprising:
computer code for, if the receiving device is not capable of exhibiting the message without adaptation of the message's content, transmitting the message to the receiving device in an adapted form; and
computer code for, if the receiving device is not capable of exhibiting the message without adaptation of the message's content, informing the transmitting device that the message was transmitted to the receiving device in adapted form.

13. The computer program of claim 10, further comprising computer code for informing the transmitting device about the differences between the message as transmitted by the transmitting device and the message in the adapted form.

14. The computer program of claim 10, further comprising computer code for, if the receiving device is not capable of exhibiting the message in any form, informing the transmitting device as to why the message cannot be exhibited by the receiving device.

15. The computer program of claim 10, further comprising:
computer code for sending an address for a secondary device from the transmitting device;
computer code for, if the receiving device is not capable of exhibiting the message without adaptation of the message's content, determining whether the secondary device is capable of exhibiting the message without adaptation of the message's content; and
computer code for, if the secondary device is capable of exhibiting the message without adaptation of the message's content, transmitting the message to the secondary device.

16. The computer program of claim 15, further comprising computer code for, if the secondary device is capable of exhibiting the message without adaptation of the message's content, informing the transmitting device that the message was transmitted to the secondary device without adaptation.

17. The computer program of claim 15, further comprising computer code for, if the secondary device is not capable of exhibiting the message without adaptation of the message's content, informing the transmitting device that the message could not be exhibited on the secondary device without adaptation of the message's content.

18. The computer program of claim 17, further comprising computer code for preventing the message from being exhibited on the secondary device if the secondary device is not capable of exhibiting the message without adaptation of the message's content.

19. A system for controlling the content of a message transmitted over a network, comprising:
a transmitting device including computer software for transmitting a message with information on the adaptability of the message, the information on the adaptability of the message being indicated via a header field in a protocol data unit for the transmitting device specifying whether adaptation of the message's content is permitted;
a service device in communication with the transmitting device; and
a receiving device for receiving the message,
wherein upon the transmittal of the message from the transmitting device to the service device, the service device determines whether the receiving device is capable of exhibiting the message without adaptation of the message's content, and wherein the service device informs the transmitting device if the message could not be exhibited on the receiving device without adaptation of the message's content.

20. The system of claim 19, wherein the transmitting device includes computer code for sending an address for a secondary device,
wherein, if the receiving device is not capable of exhibiting the message without adaptation of the message's content, the service center determines whether the secondary device is capable of exhibiting the message without adaptation of the message's content, and wherein if the secondary device is capable of exhibiting the message without adaptation of the message's content, the service center transmits the message to the secondary device for exhibition of the message.

21. The system of claim 19, wherein if the receiving device is not capable of exhibiting the message in any form, the service device informs the transmitting device as to why the message cannot be exhibited by the receiving device.

22. The system of claim 19, wherein the transmitting device transmits instructions to the service device to prevent the message from being exhibited on the receiving device if the receiving device is not capable of exhibiting the message without adaptation of the message's content.

23. The system of claim 19, wherein if the receiving device is not capable of exhibiting the message without adaptation of the message's content, the service device transmits the message to the receiving device in an adapted form, and wherein if the receiving device is not capable of exhibiting the message without adaptation of the message's content, the service device informs the transmitting device that the message was transmitted to the receiving device in adapted form.

24. A device for transmitting a message to a receiving device via a service device, comprising:
a body;
a memory unit operatively connected to the body, the memory unit including:
computer code for instructing the service device to determine whether the receiving device is capable of exhibiting the message without adaptation of the message's content based upon a header field in a protocol data unit for the device specifying whether adaptation of the message's content is permitted, and computer code for, if the receiving device is not capable of exhibiting the message without adaptation of the message's content, having the service device inform the device that the message could not be exhibited on the receiving device without adaptation of the message's content;
a processor operatively connected to the memory unit; and
a communicator configured to generate the message generated by the processor and the memory unit to the receiving device.

25. The device of claim 24, wherein the memory unit further includes computer code for, if the receiving device is not capable of exhibiting the message in any form, instructing the service device to inform the transmitting device as to why the message cannot be exhibited by the receiving device.

26. The device of claim 24, wherein the memory unit further includes computer code for, if the receiving device is not capable of exhibiting the message without adaptation of the message's content, instructing the service device to inform the transmitting device that the message was transmitted to the receiving device in adapted form.

27. The device of claim 26, wherein the memory unit further includes computer code for instructing the service device to inform the transmitting device about the differences between the message as transmitted by the transmitting device and the message in the adapted form.

28. The device of claim 24, wherein the memory unit further includes:
   computer code for sending an address for a secondary device from the transmitting device;
   computer code for, if the receiving device is not capable of exhibiting the message without adaptation of the message's content, instructing the service device to determine whether the secondary device is capable of exhibiting the message without adaptation of the message's content; and
   computer code for, if the secondary device is capable of exhibiting the message without adaptation of the message's content, transmitting the message to the secondary device.

29. A module for use in a communications device, comprising:
   a memory unit including:
      computer code for instructing a service device to determine whether a receiving device is capable of exhibiting a message without adaptation of the message's content based upon a header field in a protocol data unit for the communications device specifying whether adaptation of the message's content is permitted, and
      computer code for, if the receiving device is not capable of exhibiting the message without adaptation of the message's content, having the service device inform the communications device that the message could not be exhibited on the receiving device without adaptation of the message's content;
   a processor operatively connected to the memory unit; and
   means for communicating the message generated by the processor and the memory unit to the receiving device.

30. The module of claim 29, wherein the means for communicating comprises a wireless data communication link.

31. The module of claim 29, wherein the communicating means comprises a wired data communication link.

32. The module of claim 29, wherein the memory unit further includes computer code for, if the receiving device is not capable of exhibiting the message in any form, instructing the service device to inform the transmitting device as to why the message cannot be exhibited by the receiving device.

33. The module of claim 29, wherein the memory unit further includes computer code for, if the receiving device is not capable of exhibiting the message without adaptation of the message's content, instructing the service device to inform the transmitting device that the message was transmitted to the receiving device in adapted form.

\* \* \* \* \*